(12) United States Patent
Wu et al.

(10) Patent No.: US 12,248,457 B1
(45) Date of Patent: Mar. 11, 2025

(54) DETECTING TEMPORAL ANOMALOUS DATA USING DEPENDENCY MODELING

(71) Applicant: INTERNATIONAL BUSINESS MACHINES CORPORATION, Armonk, NY (US)

(72) Inventors: Hao Xiang Wu, Beijing (CN); Rong Zhao, Beijing (CN); Zhe Yan, Beijing (CN); Li Li Guan, Beijing (CN); Li Bo Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/454,115

(22) Filed: Aug. 23, 2023

(51) Int. Cl.
*G06F 16/23* (2019.01)

(52) U.S. Cl.
CPC .................. *G06F 16/2365* (2019.01)

(58) Field of Classification Search
CPC .................................... G06F 16/2365
See application file for complete search history.

(56) References Cited

U.S. PATENT DOCUMENTS

| | | | |
|---|---|---|---|
| 7,415,481 B2 | 8/2008 | Becker | |
| 9,292,486 B2 | 3/2016 | Cudak | |
| 10,817,271 B2 | 10/2020 | Berg | |
| 11,385,898 B2 * | 7/2022 | Gao | G06F 9/3838 |
| 11,675,801 B2 | 6/2023 | Sherman | |
| 11,681,670 B1 * | 6/2023 | Churchville | G06F 16/285 |
| | | | 707/690 |

| | | | |
|---|---|---|---|
| 2019/0325329 A1 * | 10/2019 | Rais-Ghasem | G06F 16/9024 |
| 2021/0076966 A1 | 3/2021 | Grantcharov | |
| 2022/0376970 A1 * | 11/2022 | Chawathe | H04L 41/0654 |
| 2024/0064161 A1 * | 2/2024 | Liu | H04L 41/069 |

(Continued)

FOREIGN PATENT DOCUMENTS

EP 2626797 A2 8/2013

OTHER PUBLICATIONS

Bruno, et al., "Anomaly detection through quasi-functional dependency analysis" JDIM Journal of Digital Information Management, vol. 5, No. 4, Aug. 2007, pp. 191-200.

(Continued)

*Primary Examiner* — Huawen A Peng
(74) *Attorney, Agent, or Firm* — Anthony R. Curro

(57) ABSTRACT

An embodiment for detecting anomalous data using dependency modeling. The embodiment may, within a target data environment, identify references between data contained in one or more data files. The embodiment may determine dependency relationships between data fields in the data contained in the one or more data files. The embodiment may construct computational graphs depicting the determined dependency relationships as series of related data fields. The embodiment may identify a series of associated computational graphs within the constructed computational graphs. The embodiment may calculate abnormality degree values for each of the data fields within the constructed computation graphs. The embodiment may, in response to detecting an anomalous data field having a calculated abnormality degree value above a threshold value, calculating contribution values for a series of associated component data fields to identify a root cause for the detected anomalous data field.

20 Claims, 5 Drawing Sheets

(56) References Cited

U.S. PATENT DOCUMENTS

2024/0403285 A1* 12/2024 Huang .................. G06N 3/045

OTHER PUBLICATIONS

Chen, et al., "Integrating Spreadsheet Data via Accurate and Low-Effort Extraction", ACM, KDD'14, Aug. 24-27, 2014, 10 Pages.
Lu, et al., "Dependency-based Anomaly Detection: Framework, Methods and Benchmark", arXiv:2011.06716v1 [cs.LG], Nov. 13, 2020, 39 pages.
Viswanathan, et al., "Ranking Anomalies in Data Centers", IEEE, 2012, pp. 79-87.

* cited by examiner

DETECTING TEMPORAL ANOMALOUS DATA USING DEPENDENCY MODELING

BACKGROUND

The present application relates generally to computer processing, and more particularly, to detecting anomalous data using dependency modeling.

Many businesses leverage large amounts of data stored within a variety of data environments containing increasingly large numbers of files. For example, a given businesses may leverage data contained within tables, spreadsheets, and any number of files generated by industry-specific applications. Accordingly, many businesses devote significant resources to ensuring the accuracy and reliability of source data being leveraged, published, or otherwise relied upon in the course of conducting business.

SUMMARY

According to one embodiment, a method, computer system, and computer program product for detecting anomalous data using dependency modeling is provided. The embodiment may include within a target data environment, identifying implicit and explicit references between data contained in one or more data files. The embodiment may also include determining dependency relationships between data fields in the data contained in the one or more data files. The embodiment may further include constructing computational graphs depicting the determined dependency relationships as series of related data fields. The embodiment may also include identifying series of associated computational graphs within the constructed computational graphs. The embodiment may further include calculating abnormality degree values for each of the data fields within the constructed computation graphs. The embodiment may also include, in response to detecting an anomalous data field having a calculated abnormality degree value above a threshold value, calculating contribution values for a series of associated component data fields to identify a root cause for the detected anomalous data field.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
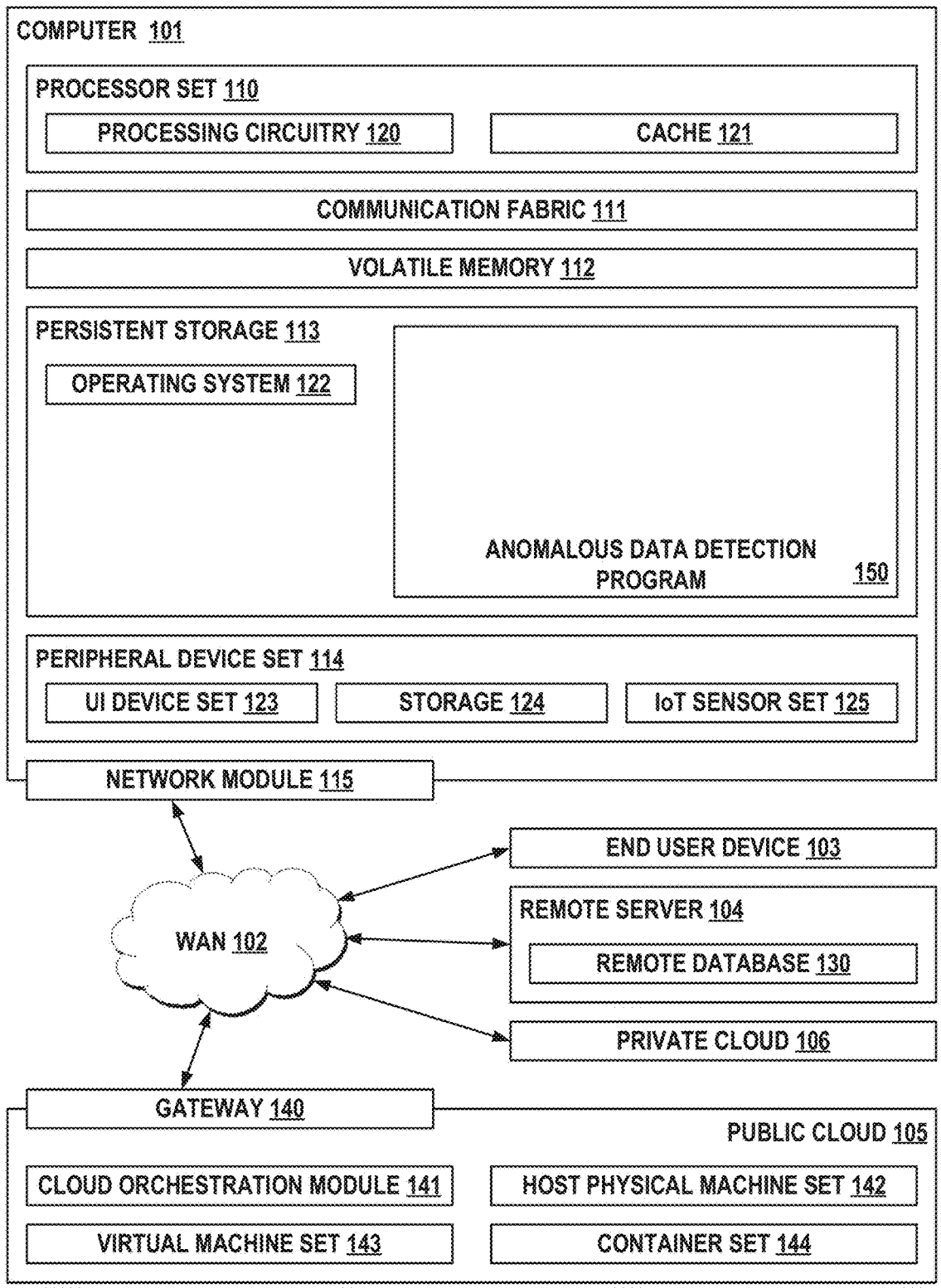
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to computer processing, and more particularly, to detecting anomalous data using dependency modeling. The following described exemplary embodiments provide a system, method, and program product to, among other things, within a target data environment, identify implicit and explicit references between data contained in one or more data files, determine dependency relationships between data fields in the data contained in the one or more data files, construct computational graphs depicting the determined dependency relationships as series of related data fields, identify series of associated computational graphs within the constructed computational graphs, calculate abnormality degree values for each of the data fields within the constructed computation graphs, and, in response to detecting an anomalous data field having a calculated abnormality degree value above a threshold value, calculate contribution values for a series of associated component data fields to identify a root cause for the detected anomalous data field.

As previously described, many businesses leverage large amounts of data stored within a variety of data environments containing increasingly large numbers of files. For example, a given businesses may leverage data contained within tables, spreadsheets, and any number of files generated by industry-specific applications. Accordingly, many businesses devote significant resources to ensuring the accuracy and reliability of source data being leveraged, published, or otherwise relied upon in the course of conducting business.

However, analysts and other personnel tasked with ensuring the accuracy and reliability of source data for a given business face many challenges that hinder their efficiency and effectiveness. For example, the presence of an error or anomalous data within a single data field may contaminate multiple downstream data fields, sometimes across multiple files. This makes it difficult for an analyst to identify a root cause for anomalous or erroneous data. Also, there is typically a lack of reference and dependency information available to analysts when, for example, the relevant data is scattered across multiple tables or spreadsheets, or even processed by multiple different individuals. This can make tracking backwards to the source data increasingly difficult for analysts, as the number of dependencies and data fields referenced become increasingly larger in number, increasingly scattered across time, and increasingly spread across multiple files. Practically, the implications of the above-described challenges result in the discovery of data anomalies relying heavily upon the experience of a given analyst and may result in overlooking of anomalous data. The above-described challenges are further amplified by the increased difficulty in users' abilities to visualize complete computation processes of relevant data which can lead to misunderstanding and misuse of the data.

Accordingly, a method, computer system, and computer program product for detecting anomalous data using dependency modeling would be advantageous. The method, system, and computer program product may, within a target data environment, identifying implicit and explicit references between data contained in one or more data files. The method, system, computer program product may determine dependency relationships between data fields in the data contained in the one or more data files. The method, system, computer program product may construct computational graphs depicting the determined dependency relationships as series of related data fields. The method, system, computer program product may then identify series of associated computational graphs within the constructed computational graphs. Then, the method, system, computer program product may calculate abnormality degree values for each of the data fields within the constructed computation graphs. Thereafter, the method, system, computer program product may, in response to detecting an anomalous data field having a calculated abnormality degree value above a threshold value, calculate contribution values for a series of associated component data fields to identify a root cause for the detected anomalous data field. In turn, the method, system, computer program product has provided for improved detecting of anomalous data using dependency modeling by leveraging computer-based methods to model dependencies between data spread across independent files. Described embodiments may then identify data fields associated with anomalous data (based on a predetermined threshold value) and calculate which related or dependent data fields contribute most to the calculation of the anomalous data. Described embodiments further generate visual depictions, via construction of computational graphs, of complex business metric calculations that may be associated with the anomalous data. Thus, described embodiments allow for early discovery of abnormal data, significantly reducing the possibility of referencing incorrect data in formal reports or finalized calculations. Furthermore, described embodiments are capable of outputting to a user visual representations of complex business metric calculations in the form of constructed computational graphs to facilitate root cause analysis of abnormal data by visually showing users which data fields contribute most to the generation of abnormal data.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as anomalous data detection program/code 150. In addition to anomalous data detection code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and anomalous data detection code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in anomalous data detection code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in anomalous data detection program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the anomalous data detection program 150 may be a program capable of, within a target data environment, identifying implicit and explicit references between data contained in one or more data files. Anomalous data detection program 150 may then determine dependency relationships between data fields in the data contained in the one or more data files. Next, anomalous data detection program 150 may construct computational graphs depicting the determined dependency relationships as series of related data fields. Anomalous data detection program 150 may then identify series of associated computational graphs within the constructed computational graphs. Next, anomalous data detection program 150 may calculate abnormality degree values for each of the data fields within the constructed computation graphs. Thereafter, anomalous data detection program 150 may, in response to detecting an anomalous data field having a calculated abnormality degree value above a threshold value, calculate contribution values for a series of associated component data fields to identify a root cause for the detected anomalous data field. In turn, anomalous data detection program 150 has provided for improved detecting of anomalous data using dependency modeling by leveraging computer-based methods to model dependencies between data spread across independent files. Described embodiments may then identify data fields associated with anomalous data (based on a predetermined threshold value) and calculate which related or dependent data fields contribute most to the calculation of the anomalous data. Described embodiments further generate visual depictions, via construction of computational graphs, of complex business metric calculations that may be associated with the anomalous data. Thus, described embodiments allow for early discovery of abnormal data, significantly reducing the possibility of referencing incorrect data in formal reports or finalized calculations. Furthermore, described embodiments are capable of outputting to a user visual representations of complex business metric calculations in the form of constructed computational graphs to facilitate root cause analysis of abnormal data by visually showing users which data fields contribute most to the generation of abnormal data.

Figure 2:
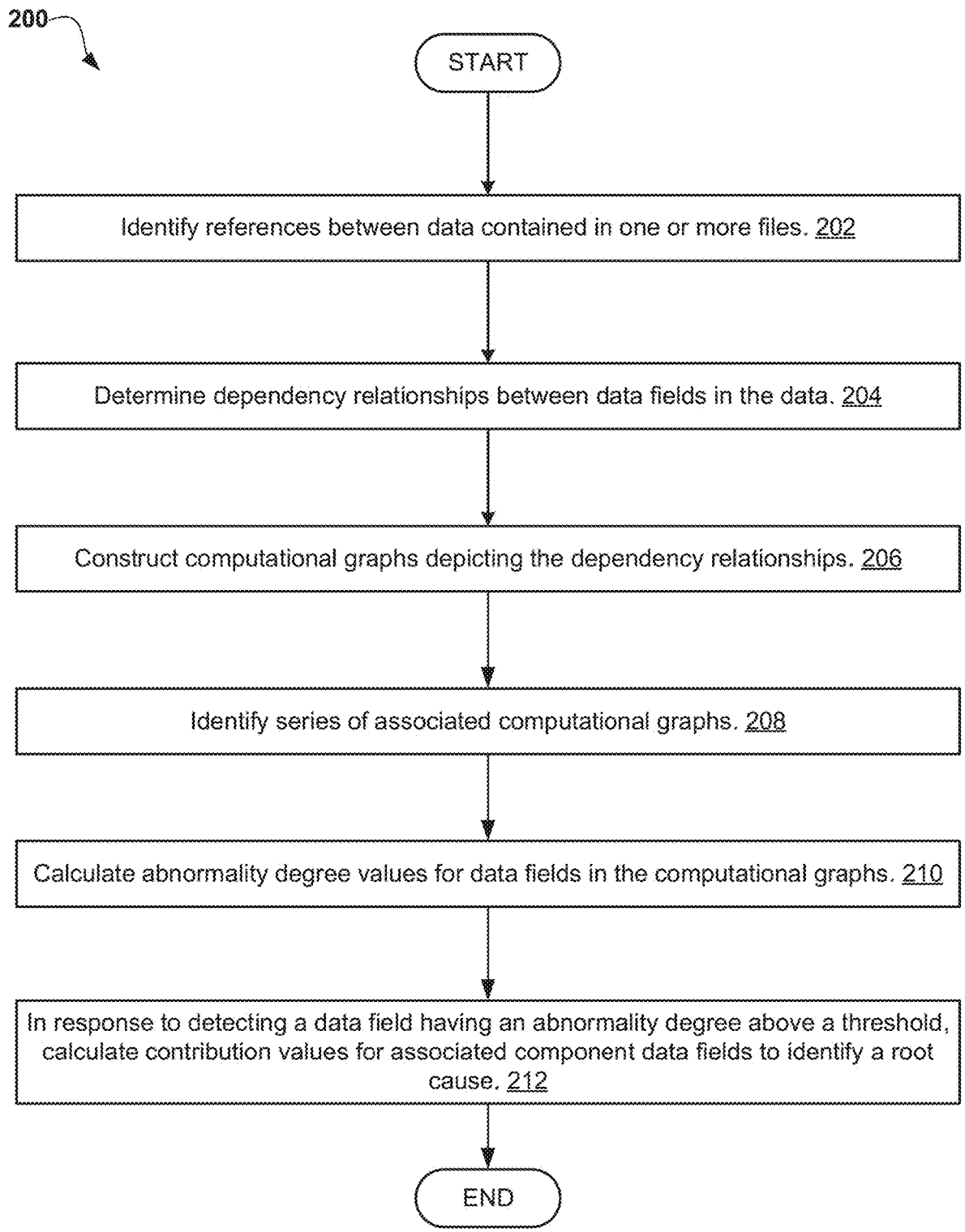
FIG. 2 illustrates an operational flowchart for an exemplary process of detecting anomalous data using dependency modeling according to at least one embodiment.

Referring now to FIG. 2, an operational flowchart for an illustrative process 200 of detecting anomalous data using dependency modeling according to at least one embodiment is provided.

Figure 3:
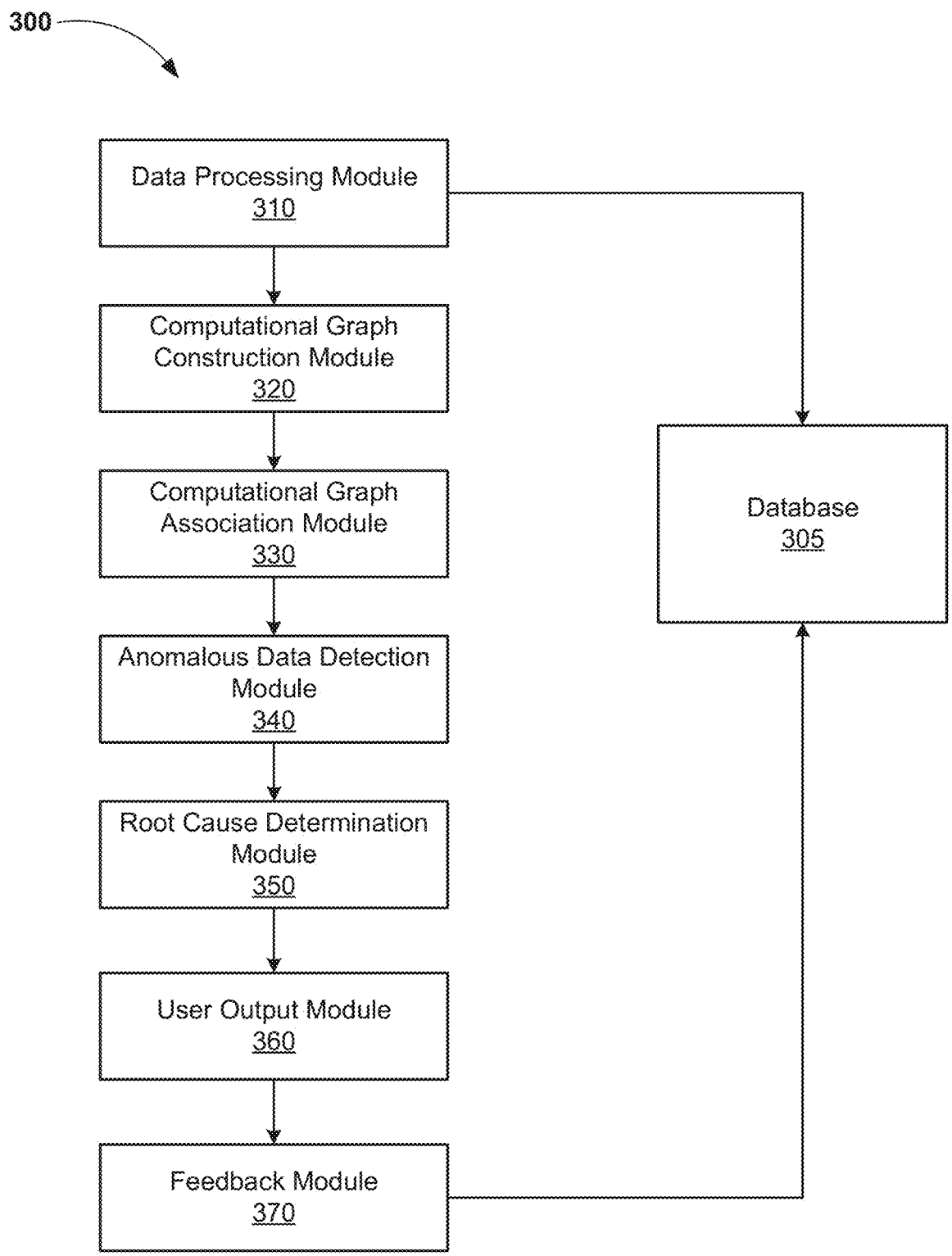
FIG. 3 depicts illustrative system architecture usable for performing an exemplary process of detecting anomalous data using dependency modeling according to at least one embodiment.

FIG. 3 depicts illustrative system architecture 300 usable for performing an exemplary process of detecting anomalous data using dependency modeling according to at least one embodiment. The exemplary system architecture 300 depicted in FIG. 3 includes a data processing module 310 for processing data in a target data environment to identify references and dependencies, a computational graph construction module 320 for constructing computational graphs including related or dependent data fields, computational graph association module 330 for identifying associated computational graphs, an anomalous data detection module 340 for calculating and scoring data with abnormality degree values to identify anomalous data, and a root cause determination module 350 for calculating contribution of data fields to anomalous data to identify a root cause. Exemplary system architecture 300 further includes an accessible database 305 which may store historical data and user feedback usable by the other components of exemplary system architecture 300. Exemplary system architecture 300 further includes a user output generation module 360 for outputting visual depictions of the root cause analysis in the form of computational graphs to an end user, and a feedback module 370 for continuously gathering and storing processed data and user feedback. Exemplary system architecture 300 will be referenced and described in greater detail throughout the description of illustrative process 200 below.

Returning to FIG. 2, at step 202 of illustrative process 200, anomalous data detection program 150 may, within a target data environment, identify implicit and explicit references between data contained in one or more data files. In the context of this disclosure, a target data environment may include any environment that includes multiple data-containing files. The multiple data-containing files in the target data environment which contain the data may originate from a variety of sources and may include any suitable file type for storing relevant or usable data, such as, for example, tables, spreadsheets, text files, CSV (Comma-separated Values) files, JSON files, various log files, and any other types of files suitable for storing data that may be used for business calculations. The data-containing files in the target data environment may further be in any suitable or desired format.

At step 202, anomalous data detection program 150 identifies implicit and explicit references between data contained in one or more data files. In the context of this disclosure, explicit references refer to data contained with two or more different files that include the same data metric or value, as well as the same associated file features (such as file name, file meta data, formulas used, etc.). In the context of this disclosure, implicit references between data may refer to data contained within two or more different files which may contain similar data metrics but have slight differences with regards to associated file features that may cause the similar data metrics to be overlooked when making determinations of explicit references between independent files. Identifying implicit and explicit references across independent files allows anomalous data detection program 150 to ensure that all available information for a given data field is considered for identifying anomalous data, as well as for remedying the identified anomalous data. While implicit references have the potential to increase convenience with this functionality, there are also unique resulting challenges that arise when discovering implicit references between data in independent data-containing files. For example, discovering implicit references between data in independent data-containing files may involve data with slightly different table names, or header names, etc. In other examples, a different number of decimal places may be retained by a given datapoint that is shared across multiple files. In yet another example, implicit data references may involve similar metric names that may have different statistical objects. For example, two data fields in independent files may be related to measurements of 'average downtime' but one data field may be related to the statistical object of 'Factory A', while the second data field is related to the statistical object of 'Factory B'. In another example, implicit data references may involve pairwise comparisons that are inefficient at larger data sizes.

In embodiments, to identify implicit and explicit references between data contained in one or more data files an exemplary data processing module 310 of an illustrative anomalous data detection program 150 may be configured to employ a variety of principles and techniques, each of which will be described below. In embodiments, at step 202, anomalous data detection program 150 may first determine if any values associated with data across different files refer to the same data metric. Anomalous data detection program 150 may consider a variety of factors when making this determination, including but not limited to, whether the values have the same value or are obtained by some rounding, whether the file names, sheet names, table names, or any other names across files are related, whether there is a correlation between table headers, row names, or any other categorical or organizational components across the files, and whether the numbers appearing in a given field, row, or column, also appears in another independent file. Next, based on the variety of factors described above, anomalous data detection program 150 may calculate approximation of two numbers to measure the closeness or similarity of data. In embodiments, the pairs of numbers above a predetermined threshold may be treated as the same number and subsequently used for performing dependency analysis. In embodiments, numbers for which no identical number can be found, and which are not the result of any calculation formula may be treated as numbers without a reliable source. In embodiments, data processing module 310 of anomalous data detection program 150 may be configured to leverage any known and suitable methods for calculating the approximation of two numbers as may be appropriate for a given context for certain data or file types.

In embodiments, data processing module 310 of anomalous data detection program 150 may be further configured to leverage data field clusters to find references between data fields across independent files. In such embodiments, data processing module 310 of anomalous data detection program 150 may first calculate feature vectors for each data field being considered by using word embeddings to generate feature vectors of data field metadata. For example, if considering data fields across independent spreadsheets, anomalous data detection program 150 may generate feature vectors for the spreadsheet name, table name, column names, row names, etc. This may be represented with the following exemplary formula:

$$V_{meta}=[V_{docName}, V_{tableName}, V_{columnName}, V_{rowName}]$$

Next, data processing module 310 of anomalous data detection program 150 may leverage a clustering algorithm to cluster data fields. This would result in all similar data fields being aggregated inside a cluster. Data processing module 310 of anomalous data detection program 150 may be configured to divide similar data fields within the clusters into two types. The first type may include data fields having the same value, or which may be rounded (e.g. 3.312 and 3.31), which are treated as multiple copies of data belong to different file. The second type may include data fields with different values which are treated as different versions of a data field at different statistical objects or times. In embodiments, data processing module 310 of anomalous data detection program 150 may further be configured to leverage data co-occurrence principles to identify data references. For each data point or data field, there is an associated file. Therefore, associations on a file level (i.e. table level or document level) may be established inside a given cluster. For example, in an exemplary table, if some data in a row or column is referenced by another table, there is a high probability that this same data will also be referenced by it at the same time. In some embodiments, for example, anomalous data detection program 150 may leverage an exemplary formula defining the distance for such a data co-occurrence as follows:

$$d_{cooccurrence}(x,y)=1/(w_{table}N_{table}x,y+w_{column}N_{column}x, y+w_{row}N_{row}x,y)$$

Additionally, in some embodiments, anomalous data detection program 150 may be configured to generate second round data field clusters based on the previously obtained clusters and feature vectors. For example, in a first step, anomalous data detection program 150 may calculate the feature vectors for each data field using word embedding vectors from a first round of cluster generation, and then combine data co-occurrence calculations with vectors of field meta data. In embodiments, anomalous data detection program 150 may then leverage a predetermined distance function to identify implicit references. In such embodiments, anomalous data detection program 150 may be configured to leverage exemplary defined distance functions presented as follows:

$$distance(x,y)=\|X_{DocName}-Y_{DocName}\|+\|X_{TableName}-Y_{TableName}\|+\|X_{ColumnName}-Y_{ColumnName}\|+\|X_{RowName}-Y_{RowName}\|+d_{cooccurrence}(x,y)$$

$$d_{cooccurrence}(x,y)=1/(w_{table}N_{table}x,y+w_{column}N_{column}x, y+w_{row}N_{row}x,y)$$

Figure 4:
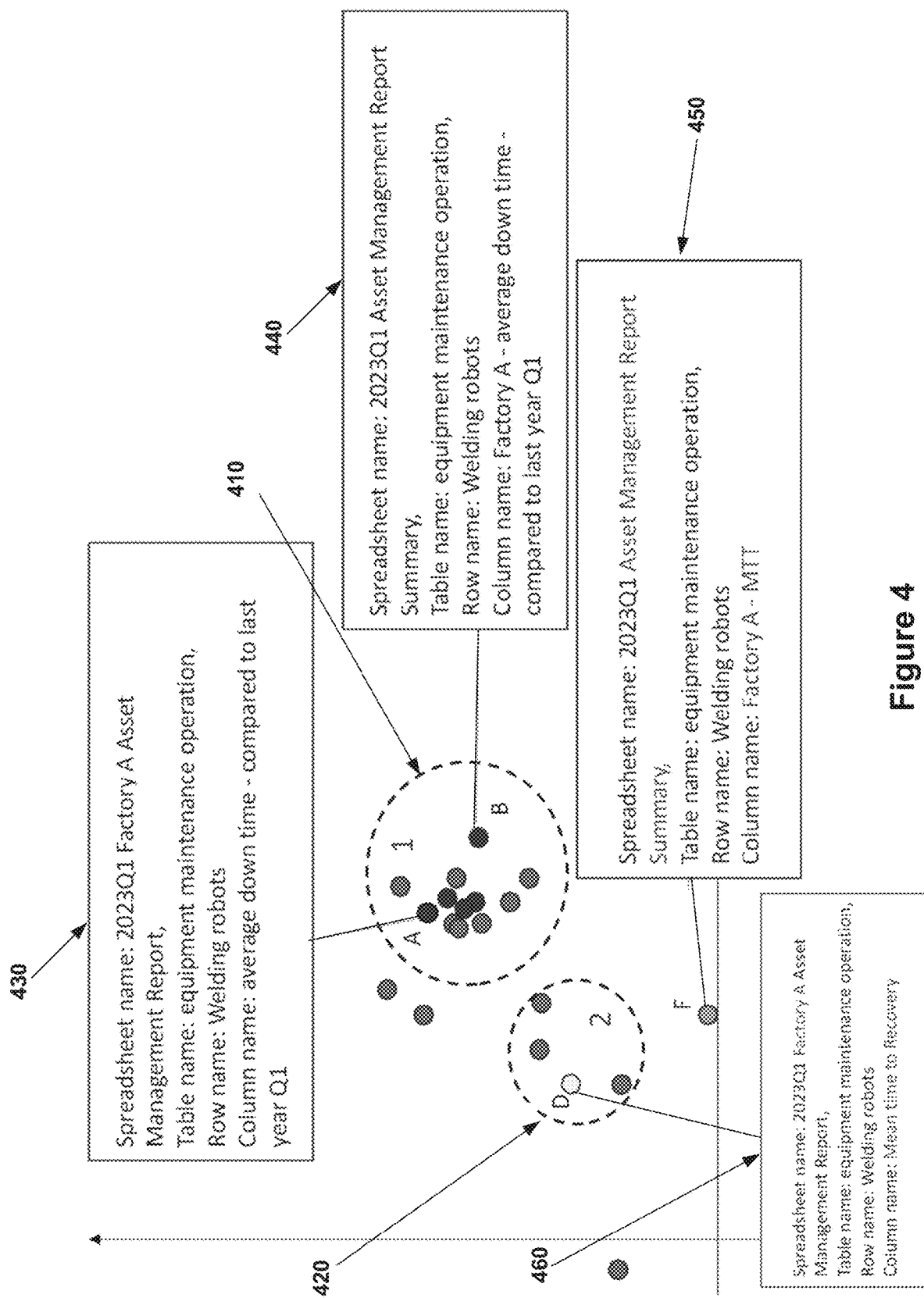
FIG. 4 illustrates an exemplary cluster scheme that may be generated by described embodiments identifying implicit and explicit references between data from multiple files according to at least one embodiment.

Anomalous data detection program 150 may then leverage a suitable clustering algorithm to cluster the data points. This process would be repeated until no new data points were added. FIG. 4 depicts exemplary cluster scheme 400 that may be generated by anomalous data detection program 150 when employed to process data from a series of independent tables within a shared data environment. In FIG. 4, as a prerequisite, within cluster 1 shown at 410, point A corresponding to summarized data shown at 430 and B corresponding to summarized data shown at 440 share the same numerical value, so the correlation between the table and spreadsheet they are on is increased. It may be noted that point F, corresponding to summarized data shown at 450 is not in cluster 2 shown at 420, but due to the correlation between the table where point D (corresponding to summarized data shown at 460) is located and where point F is located, point F is included within cluster 2 at 420 by the clustering algorithm using the new distance with data co-occurrence.

Next, at 204, anomalous data detection program 150 may determine dependency relationships between data fields in the data contained in the one or more data files. In other words, the data processing module 310 of anomalous data detection program 150 will functionally determine which data is the source data, and which data is contained in a file that is dependent upon source data elsewhere. In embodiments, for example, anomalous data detection program 150 may be configured to determine dependency relationships of data by checking if the source data for a given data field and formula needed to calculate the data are available in each file. If the data is calculated in a certain file, then that file is the dependent spreadsheet. Anomalous data detection program 150 may then further determine which file is more likely to be the source data based on file name, table name, or other available naming data. Furthermore, anomalous data detection program 150 may leverage metadata of the file and labels contained therein to determine that a file contains source data. For example, if an exemplary file 'A' includes metadata or labels such as "Basic data' or "Fundamental number", anomalous data detection program 150 could determine that the exemplary file 'A' contains source data.

Figure 5:
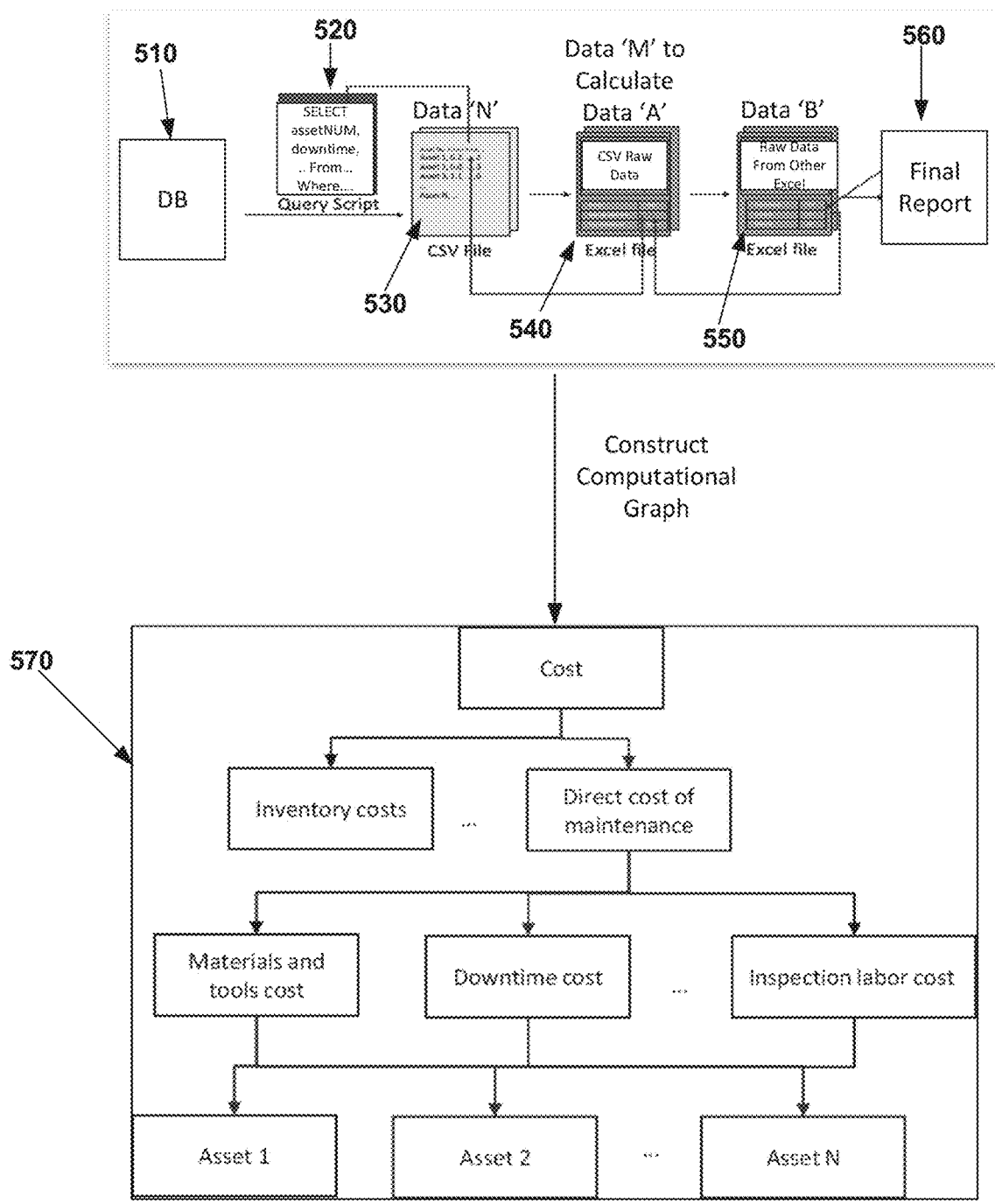
FIG. 5 illustrates a diagrammatic view of an exemplary process of constructing computational graphs for a series of related data fields sourced from multiple files according to at least one embodiment.

At 206, anomalous data detection program 150 may leverage a computational graph construction module (shown at 320 in FIG. 3) to construct computational graphs depicting the determined dependency relationships as series of related data fields. FIG. 5 illustrates a diagrammatic view of an exemplary process 500 of constructing computational graphs for a series of related data fields sourced from multiple files according to at least one embodiment. In FIG. 5, a series of files are shown including a database 510 running a query script 520 that leverages exemplary data 'N' within a CSV file 530 associated with assets, exemplary data 'M' which is used to calculate exemplary data 'A' within an excel file 540 associated with downtime costs, and exemplary data 'B' within a second excel file 550 associated with costs of maintenance, all of which is leveraged to generate a final report showing total 'cost' at 560. It should be noted that database 510 also has a tabular structure, whereas the query script 520 is an explicit referential relationship between a given piece of data in the CSV file 530 and a piece of data in a table in database 510. In this example, once exemplary data processing module 310 of anomalous data detection program 150 has determined applicable references and data dependencies (as described above in connection with steps 202 and 204) for the relevant data in the target data environment shown in FIG. 5, then exemplary computational graph construction module 320 of anomalous data detection program 150 may be used to construction computational graphs, as shown at 570. In the example shown in FIG. 5, exemplary data 'B' within the second excel file 550 references to exemplary data 'A' within excel file 540, which is calculated from exemplary data 'M'. Exemplary data 'M' is raw data used to calculate data 'A', and therefore references to exemplary data 'N', the raw data within the CSV file at 530. Thus, anomalous data detection program would determine that exemplary data 'B' depends upon exemplary data 'N'. Computational graph construction module 320 of anomalous data detection program 150 may then construct computational graph 570, as shown in FIG. 5, which provides a visual depiction of the above information. As seen in computational graph 570, the 'total cost' as reported in the final report at 560 is dependent upon the 'direct cost of maintenance' corresponding to exemplary data 'B' at 550, which is dependent upon 'downtime costs' and 'assets' corresponding to the raw data 'N' in the CSV file at 530 and 'Data M' in the excel file at 540. Anomalous data detection program 150 may construct any number of computational graphs depicting all related and dependent data fields within data associated with all relevant files stored in the target data environment.

At 208, anomalous data detection program 150 may then identify series of associated computational graphs within the constructed computational graphs. Once anomalous data detection program 150 has constructed the computational graphs in step 206, anomalous data detection program 150 will then seek to further organize the constructed computational graphs by finding connections or associations between the constructed graphs as well as any stored constructed computational graphs contained within historical data (for example stored within accessible database 305 as shown in FIG. 3). In embodiments, a computational graph association module 330 (see FIG. 3) of an illustrative anomalous data detection program 150 may be configured to identify associated computational graphs based on at least two types of relationships, although other relationships may be envisioned.

First, a computational graph association module 330 of an illustrative anomalous data detection program 150 may consider a time perspective to identify associated computational graphs that may include similar data based on comparisons to each other and historical data. From a time perspective, historical data often includes multiple 'copies' of a data metric that exists at different points in time while still maintaining similar statistical targets and methods (the only difference being the timing of the calculation). For example, this may be observed when comparing two independent files including data for inspection costs for a specific machine in Q1 and Q2 of a shared year. In embodiments, anomalous data detection program 150 may be configured to access a storage component or database (not shown) of historical data and files for purposes of comparing historical data with data being processed in the target data environment. Thus, anomalous data detection program 150 may identify historical computational graphs which are similar to the constructed computational graph but include differences in the time at which calculations in the historical computational graphs were made.

Second, a computational graph association module 330 of an illustrative anomalous data detection program 150 may consider calculation methods and the target statistical objects used to calculate data in different computational graphs. For example, in embodiments, at a fixed point in time, a data metric may involve similar calculation methods but different statistical targets, resulting in multiple "copies" of the indicator with similar statistical methods but differing values due to differences in the target being measured. This may be observed, for example, when observing data related to annual cash flows of two different subsidiaries in a shared year of 2022.

Next, at 210, anomalous data detection program 150 may calculate abnormality degree values for each of the data fields within the constructed computation graphs. At this step, anomalous data detection program 150 is calculating an abnormality degree value which is functionally a numerical score used to indicate the presence of abnormal or anomalous data. In embodiments, an anomalous data detection module 340 (See FIG. 3) anomalous data detection program 150 may be configured to calculate abnormality degree values for each of the data fields by employing a formula that is configured to consider a variety of desired factors. For example, in embodiments, the abnormality degree value may be influenced by the magnitude of fluctuations in values between data metrics in a given data field and similar series of data metrics contained within the identified series of associated computational graphs from step 208. This may be measured by determining a fluctuation of the values of the same statistical objects within accessible historical data. In embodiments, the abnormality degree value may be further influenced by whether there are differences in the way the a given data metric within a data field is calculated between the data metric and the same series, and the size of the differences, which can be measured by comparing differences in the same metric for different statistics or in the way the same statistics are computed at different points in time (based on comparing constructed computational graphs and historical computational graphs). In embodiments the abnormality degree value may be influenced by identifying historical data which may include other data metrics that are positively or negatively correlated with the data metrics in present data fields in question, and then examining the current data fields and data metrics for any irregularities that do not follow established patterns. In other embodiments, other factors may be considered for calculating the abnormality degree values (sometimes referred to as scores) as may be desired or suitable for different data environments and contexts. Anomalous data detection program 150 may be configured to include any desired threshold value or score to be used as an indicator that anomalous or abnormal data may be present. Adjusting the threshold will accordingly adjust the sensitivity of anomalous data detection program 150 in determining that a given data field includes anomalous or abnormal data.

Thereafter at 212, anomalous data detection program 150 may, in response to detecting an anomalous data field having a calculated abnormality degree value above a threshold value, calculate contribution values for a series of associated component data fields to identify a root cause for the detected anomalous data field. By calculating contribution values for each data field with respect to a detected anomalous data field, and then normalizing the contribution values to get a component weight, a root cause determination module 350 (see FIG. 3) of anomalous data detection program 150 may identify which data fields contributed most, or essentially caused, the presence of the detected anomalous data field. In embodiments, the data field with the highest calculated contribution value may be identified by anomalous data detection program 150 as a potential root cause. For example, if an exemplary data field 'D1' for downtime costs was determined to be anomalous or abnormal, anomalous data detection program 150 would calculate contribution values for a series of associated exemplary component data fields 'D2', 'D3', and 'D4', upon which 'D1' is dependent and therefore shares a computational graph with. If it is found that the data field associated with 'D3' contributed the most to the anomalous data field 'D1', then it may be identified by anomalous data detection program 150 as a likely root cause of the abnormal or anomalous data.

In embodiments, anomalous data detection program 150 may further include a user output generation module 360. User output generation module 360 of anomalous data detection program 150 may be configured to output to a user the identified root cause for a given anomalous or abnormal data field, as well as any associated constructed computational graphs. The identified root cause may be output using any suitable user interface (UI) that is usable with the connected data environment or an associated application or tool. In embodiments, the user output generation module 360 may further output and display to the user explainability in the form of marked or visually modified constructed computational graphs associated with the identified root cause to help provide the user with the relevant files, dependencies, and any identified implicit or explicit references from step 202. In embodiments, the user output generation module 360 of anomalous data detection program 150 may further be configured to gather user feedback regarding the identified root cause. The gathered user feedback may correspond to acceptance or rejection of the identified root cause, information related to specific involved data fields, or other information and feedback regarding the output explainability.

In embodiments, anomalous data detection program 150 may further include a feedback module 370. Feedback module 370 of anomalous data detection program 150 may collect and store data processed or generated by anomalous data detection program 150, as well as user feedback data gathered by the user output generation module 360. This data may be stored in any accessible and suitable data storage component or mechanism, such as, for example, database 305 (See FIG. 3). The stored data may then be leveraged by anomalous data detection program 150 to improve the identification of anomalous or abnormal data in the connected data environment.

It may be appreciated that anomalous data detection program 150 has thus provided improved detecting of anomalous data using dependency modeling by leveraging computer-based methods to model dependencies between data spread across independent files. Described embodiments may then identify data fields associated with anomalous data (based on a predetermined threshold value) and calculate which related or dependent data fields contribute most to the calculation of the anomalous data. Described embodiments further generate visual depictions, via construction of computational graphs, of complex business metric calculations that may be associated with the anomalous data. Thus, described embodiments allow for early discovery of abnormal data, significantly reducing the possibility of referencing incorrect data in formal reports or finalized calculations. Furthermore, described embodiments are capable of outputting to a user visual representations of complex business metric calculations in the form of constructed computational graphs to facilitate root cause analysis of abnormal data by visually showing users which data fields contribute most to the generation of abnormal data.

It may be appreciated that FIGS. 2-5 provide only illustrations of an exemplary implementation and does not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of detecting anomalous data using dependency modeling, the method comprising:
within a target data environment, identifying implicit and explicit references between data contained in one or more data files, explicit references referring to data contained in the data files that include the same data metric or value and associated file features, implicit references referring to data contained in the data files which contain similar data metrics but have slight differences with regard to associated file features that cause similar data metrics to be overlooked;
determining dependency relationships between data fields in the data contained in the one or more data files;
constructing computational graphs depicting the determined dependency relationships as series of related data fields in the one or more data files;
identifying series of associated computational graphs within the constructed computational graphs;
calculating abnormality degree values for each of the data fields within the constructed computation graphs; and
in response to detecting an anomalous data field having a calculated abnormality degree value above a threshold value, calculating contribution values for a series of associated component data fields in the one or more data files to identify a root cause for the detected anomalous data field.

2. The computer-based method of claim 1, wherein the identified implicit references are detected by calculating feature vectors for the data fields, employing a clustering algorithm to aggregate and cluster similar data fields, and then combining data co-occurrence with vectors of associated field meta data to identify the implicit references based on a predetermined distance function.

3. The computer-based method of claim 1, wherein identifying the series of associated computational graphs within the constructed computational graphs further comprises:
identifying historical computational graphs which are similar to the constructed computational graph but have a different time at which calculations in the historical computational graphs were made.

4. The computer-based method of claim 1, wherein calculating the abnormality degree values for each of the data fields within the constructed computation graphs further comprises:
calculating fluctuations in data metrics between each of the data fields and a series of historical data fields in the associated computational graphs.

5. The computer-based method of claim 1, further comprising:
outputting to a user the identified root cause and a corresponding computational graph.

6. The computer-based method of claim 5, further comprising:
gathering and storing processed data and user feedback data corresponding to the output identified root cause.

7. The computer-based method of claim 1, wherein the identified root cause corresponds to the component associated data field having a highest calculated contribution value.

8. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
within a target data environment, identifying implicit and explicit references between data contained in one or more data files, explicit references referring to data contained in the data files that include the same data metric or value and associated file features, implicit references referring to data contained in the data files which contain similar data metrics but have slight differences with regard to associated file features that cause similar data metrics to be overlooked;

determining dependency relationships between data fields in the data contained in the one or more data files;

constructing computational graphs depicting the determined dependency relationships as series of related data fields in the one or more data files;

identifying series of associated computational graphs within the constructed computational graphs;

calculating abnormality degree values for each of the data fields within the constructed computation graphs; and in response to detecting an anomalous data field having a calculated abnormality degree value above a threshold value, calculating contribution values for a series of associated component data fields in the one or more data files to identify a root cause for the detected anomalous data field.

9. The computer system of claim 8, wherein the identified implicit references are detected by calculating feature vectors for the data fields, employing a clustering algorithm to aggregate and cluster similar data fields, and then combining data co-occurrence with vectors of associated field meta data to identify the implicit references based on a predetermined distance function.

10. The computer system of claim 8, wherein identifying the series of associated computational graphs within the constructed computational graphs further comprises:

identifying historical computational graphs which are similar to the constructed computational graph but have a different time at which calculations in the historical computational graphs were made.

11. The computer system of claim 8, wherein calculating the abnormality degree values for each of the data fields within the constructed computation graphs further comprises:

calculating fluctuations in data metrics between each of the data fields and a series of historical data fields in the associated computational graphs.

12. The computer system of claim 8, further comprising:

outputting to a user the identified root cause and a corresponding computational graph.

13. The computer system of claim 12, further comprising: gathering and storing processed data and user feedback data corresponding to the output identified root cause.

14. The computer system of claim 8, wherein the identified root cause corresponds to the associated component data field having a highest calculated contribution value.

15. A computer program product, the computer program product comprising:

one or more computer-readable tangible storage medium and program instructions stored on at least one of the one or more computer-readable tangible storage medium, the program instructions executable by a processor capable of performing a method, the method comprising:

within a target data environment, identifying implicit and explicit references between data contained in one or more data files, explicit references referring to data contained in the data files that include the same data metric or value and associated file features, implicit references referring to data contained in the data files which contain similar data metrics but have slight differences with regard to associated file features that cause similar data metrics to be overlooked;

determining dependency relationships between data fields in the data contained in the one or more data files;

constructing computational graphs depicting the determined dependency relationships as series of related data fields in the one or more data files;

identifying series of associated computational graphs within the constructed computational graphs;

calculating abnormality degree values for each of the data fields within the constructed computation graphs; and in response to detecting an anomalous data field having a calculated abnormality degree value above a threshold value, calculating contribution values for a series of associated component data fields in the one or more data files to identify a root cause for the detected anomalous data field.

16. The computer program product of claim 15, wherein the identified implicit references are detected by calculating feature vectors for the data fields, employing a clustering algorithm to aggregate and cluster similar data fields, and then combining data co-occurrence with vectors of associated field meta data to identify the implicit references based on a predetermined distance function.

17. The computer program product of claim 15, wherein identifying the series of associated computational graphs within the constructed computational graphs further comprises:

identifying historical computational graphs which are similar to the constructed computational graph but have a different time at which calculations in the historical computational graphs were made.

18. The computer program product of claim 15, wherein calculating the abnormality degree values for each of the data fields within the constructed computation graphs further comprises:

calculating fluctuations in data metrics between each of the data fields and a series of historical data fields in the associated computational graphs.

19. The computer program product of claim 15, further comprising:

outputting to a user the identified root cause and a corresponding computational graph.

20. The computer program product of claim 19, further comprising:

gathering and storing processed data and user feedback data corresponding to the output identified root cause.

* * * * *